United States Patent
Li et al.

(10) Patent No.: US 8,744,409 B2
(45) Date of Patent: Jun. 3, 2014

(54) LOCATION METHOD, DEVICE AND SYSTEM FOR SECURE USER PLANE LOCATION ENABLED TERMINAL

(75) Inventors: Hui Li, Shenzhen (CN); Liang Shan, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 63 days.

(21) Appl. No.: 13/580,459

(22) PCT Filed: Mar. 25, 2011

(86) PCT No.: PCT/CN2011/072175
§ 371 (c)(1),
(2), (4) Date: Aug. 22, 2012

(87) PCT Pub. No.: WO2011/120404
PCT Pub. Date: Oct. 6, 2011

(65) Prior Publication Data
US 2013/0012166 A1 Jan. 10, 2013

(30) Foreign Application Priority Data
Apr. 2, 2010 (CN) .......................... 2010 1 0142690

(51) Int. Cl.
*H04M 1/66* (2006.01)
*H04W 4/02* (2009.01)

(52) U.S. Cl.
CPC ..................................... *H04W 4/02* (2013.01)
USPC ..... 455/411; 455/433; 455/456.6; 455/456.2; 455/456.1; 455/435.1

(58) Field of Classification Search
CPC ..................................................... H04W 4/02
USPC ............. 455/456.1, 456.2, 435.1, 456.6, 411, 455/433
See application file for complete search history.

(56) References Cited

U.S. PATENT DOCUMENTS

2009/0280807 A1* 11/2009 Kawai et al. ............... 455/435.1
2010/0234022 A1* 9/2010 Winterbottom ............... 455/433
(Continued)

FOREIGN PATENT DOCUMENTS

CN 101087254 A 12/2007
CN 101411092 A 4/2009
(Continued)

OTHER PUBLICATIONS

International Search Report for PCT/CN2011/072175 dated Jun. 7, 2011.

*Primary Examiner* — David Q Nguyen
(74) *Attorney, Agent, or Firm* — Ling Wu; Stephen Yang; Ling and Yang Intellectual Property (57) ABSTRACT

A method for locating a Secure User Plane Location (SUPL) Enabled Terminal (SET) is provided by the present invention. The method includes that: the SET obtaining the location service information of the local access network when accessing the local access network, wherein the location service information includes the address and/or identification of at least one of the location server in the local access network; the SET transmitting the location service information of the local access network to the Home SUPL Location Platform (H-SLP) of the SET; and the SET receiving the location service information transmitted by the H-SLP, wherein the location service information includes the address and/or identification of the location server providing the location service for the SET in the local access network. An SET and an H-SLP are also provided by the present invention.

13 Claims, 7 Drawing Sheets

(56) References Cited

U.S. PATENT DOCUMENTS

2010/0311439 A1* 12/2010 Thomson et al. .......... 455/456.1
2011/0231561 A1* 9/2011 Pawson et al. ................ 709/228

FOREIGN PATENT DOCUMENTS

| CN | 101639525 A | 2/2010 |
| CN | 101848415 A | 9/2010 |

* cited by examiner

LOCATION METHOD, DEVICE AND SYSTEM FOR SECURE USER PLANE LOCATION ENABLED TERMINAL

TECHNICAL FIELD

The present invention relates to the communication field, and in particular, to a method, apparatus and system for locating a Secure User Plane Location (SUPL) Enabled Terminal (SET).

BACKGROUND OF THE RELATED ART

As one of the characteristic service of the mobile communication system, the location service is always considered to be a bright spot of the mobile value-added service in the future. At present, the main mobile communication operators of the countries and areas, such as, North America, Europe, and the Asian-Pacific, etc., already provide the mobile location service. The location service is the most attractive service in the mobile value-added service, and also is one of the most complicated service in each part of the industry chain at the same time.

LOC is established by incorporating the work of the LIF forum, the location service in the Wireless Access Protocol (WAP) forum, and the third stage relevant work of the Location Services (LCS) of the 3rd Partner Project (3GPP) Release 6 (R6) by the Open Mobile Architecture (OMA) in 2002, of which the objective is to realize establishing the interconnection and intercommunication location service standard, establishing the specification of the mobile location service, and ensuring the interoperation from end to end. At present, the OMA LOC is replacing the 3GPP and 3GPP2 progressively in the research field, such as, roaming and the Le interface, etc., and becomes the main international specification framer of the location service standard. The main work of the OMA LOC is to establish the location technology based on the User plane in the mobile communication network, realize transmitting, in the IP channel, the relevant location parameter in the control plane location technology in the former mobile communication network, and then realize the location, and reduce the reliance on the core network at the same time, reduce the coupling, and increase the flexibility. With the constant development of the requirement, the OMA LOC also studies on how to provide the location service for the non-mobile communication network progressively, such as, the location of the fixed access way, the location of the Internet way, the location of the WLAN way, etc.

At present, according to the Secure User Plane Location (SUPL) technology defined by the Open Mobile Architecture (OMA) location group (LOC), this location system is mainly composed of three function entities, which are the SUPL Agent, the SUPL server, that is, the SUPL Location Platform (SLP) and the SUPL Enabled Terminal (SET) respectively.

Figure 1:
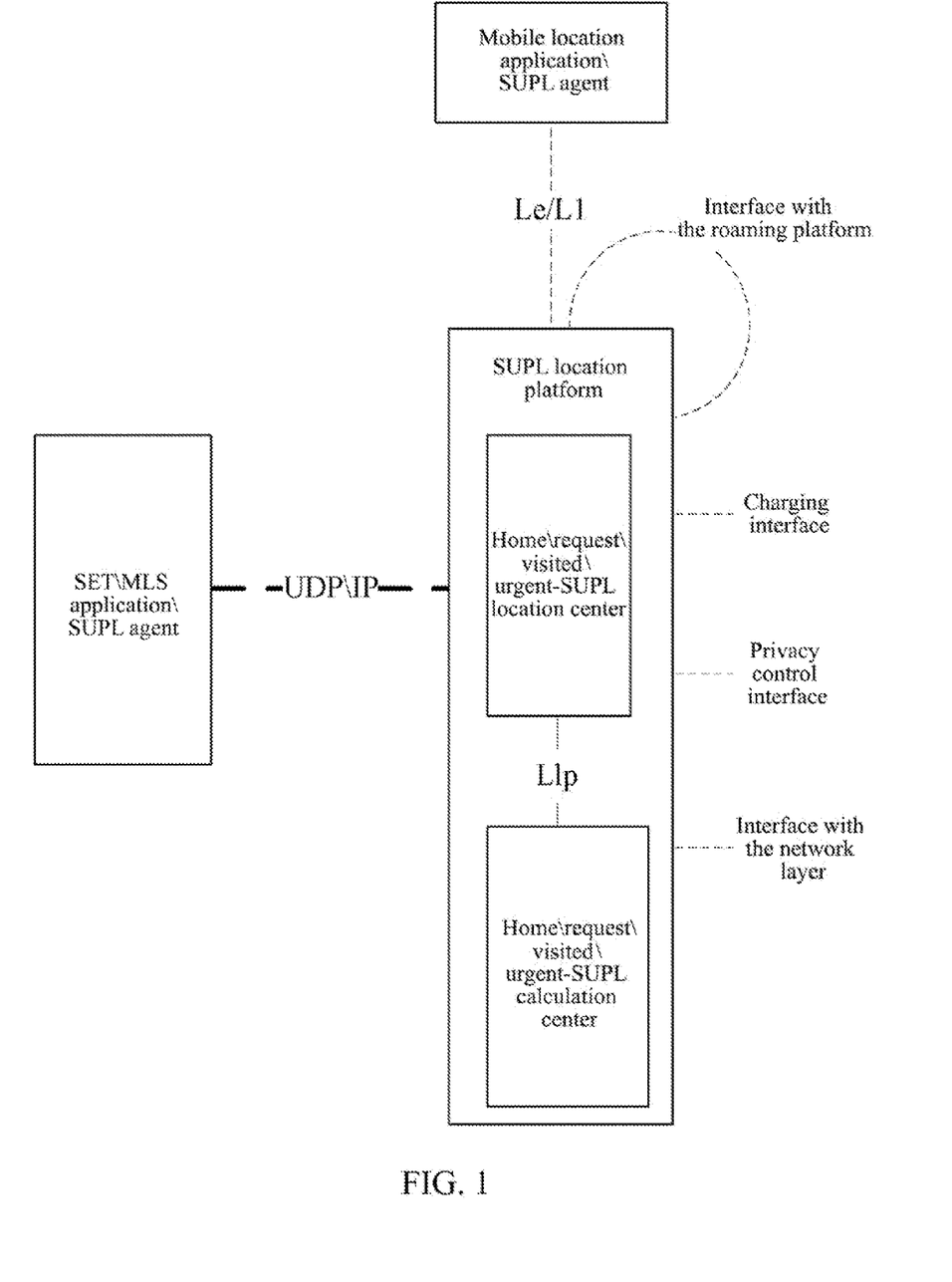
FIG. 1 is a schematic diagram of the structure of a system for locating an SUPL in the related art.

In the SUPL location system, the relation among the above-mentioned three function entities is shown in FIG. 1. The principle of the current SUPL location technology is described by combining the accompanying FIG. 1 hereinafter:

the SUPL-enabled Terminal (SET) is the located SET, which establishes the SUPL location conversation connection with the SUPL location platform through the User Datagram Protocol (UDP)/Internet Protocol (IP) way, and the corresponding function interface is the Lup interface, and the protocol is the SUPL protocol. Through the SUPL protocol, the location information of the SET can be obtained.

The SET can include one Mobile Location Services (MLS) application, or SUPL agent. Both the MLS application and the SUPL agent can request the SET to perform the location service through the private interface on the SET, or the interface comply with the Mobile Location Protocol (MLP).

The Le/L1 interface is adopted between the SUPL location platform and the mobile location application\SUPL agent of the network side, and the protocol is MLP or LOC SIP. The function is that: the third party location application system\the SUPL agent requests the SUPL location platform to locate the SET service through the Le/L1 interface.

The SUPL location platform includes two function entities, which respectively are: the SUPL Location Center (SLC) and the SUPL Positioning Centre (SPC). When the SUPL location platform works by the non-agent way, the SLC and the SPC are separated, and have one individual interface relation with the SET respectively; when it works by the agent way, there is only one function interface between the SUPL location platform and the SET, that is, the interface between the SLC and the SET, and there is no interface between the SPC and the SET, the SLC serves as the agents of the SPC and the SET, and the interface between the SLC and the SPC is the LIP. Because of the roaming of the SET, the SUPL location platform may respectively serve as the function roles such as: the roaming location platform, the request location platform, the home location platform, and the urgent location platform, etc. The corresponding SLC and SPC all have these function roles.

Besides the above-mentioned description, the SUPL location platform also supports other interfaces, such as: the roaming interface between the platforms, the interface between the platform and the calculation server, the interface between the platform and the privacy server, the interface between the platform and the network layer.

The SUPL agent can provide one function of accessing the location service to the application, which is the first service access point provided for the outside by the location service system. The application locates one or more SETs through the SUPL agent request.

Figure 2:
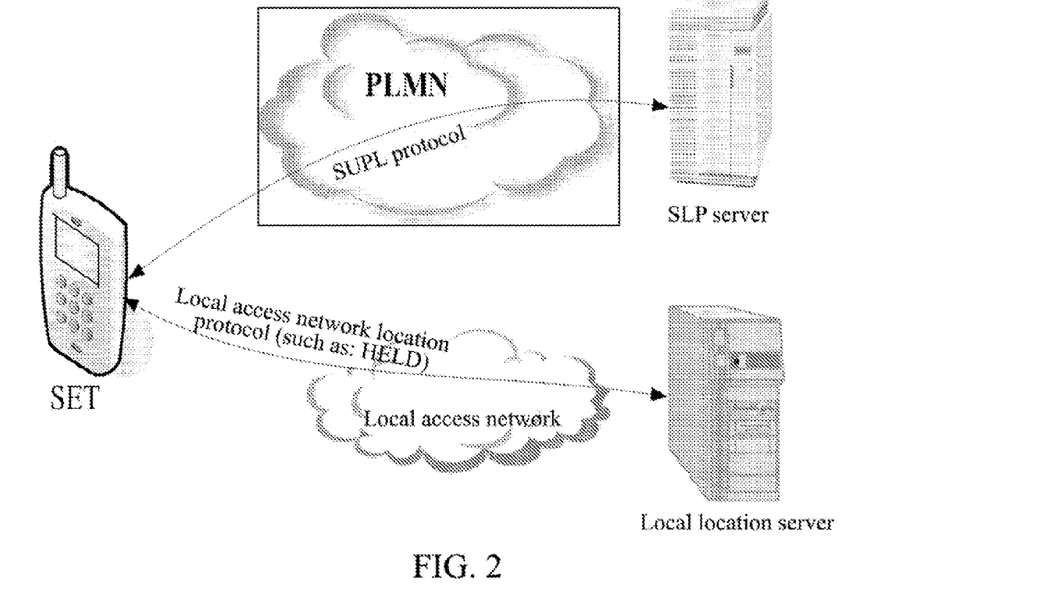
FIG. 2 is a schematic diagram of a way for locating an SET in the related art.

At present, the SET, except being able to access the Public Land Mobile Network (PLMN), also can access the local access network, for example, accessing the Wireless Local Area Network (WLAN), or xDSL\FTTx network. In different communication networks, the location technologies are different from each other, for example, in the PLMN, the location technology of 3GPP LCS and the location technology of OMA SUPL can be adopted, while in the local access network the location technology of IETF HELD can be adopted. The PLMN location described in the present invention, under the situation which is not specially illustrated, means the location based on the SUPL, as shown in FIG. 2:

when the SET can access the PLMN and the local access network at the same time, the SET can select the location service provided by the PLMN and also can select the location service of the local access network to perform location. The network of which the location server is adopted to perform location may be decided by a plurality of factors, such as, location accuracy, location representation way, and the expenses, etc.

For the PLMN location service, the technology is already ripe at present. For example, for the 3GPP network, the SET can adopt the location method based on the control plane, and also can adopt the location method based on the user plane.

When the SET can find the location server of the local access network by itself and signs the location service with the local access network, the SET at this moment can totally determine to use the location service of which network independently. At this moment, the relation between the location service of the local location network and the location service provided by the PLMN is the competitive relation.

It can be seen from FIG. 2, when the SET uses the location service provided by the local access network directly, there is no any relation between the SET and the SLP server based on the PLMN. The two location systems are totally independent.

For the operator of the PLMN, they hope that no matter the user of the Home Network accesses the PLMN or other local access networks, the user can access the location service conveniently. When the user accesses the local access network, since the location service provided by the local access network may meet the user requirement even more, at this moment the operator hopes the user can also use the location service of the local access network in a situation that the user does not sign the service with the local access network.

The OMA LOC group defines that the SET always requests the location service from the home location server, and obtains the location service, and the user can only use the home location server but cannot use the location service of the local access network when accessing other local access networks, which impacts the user experience.

CONTENT OF THE INVENTION

The present invention provides a method, apparatus and system for locating a SET, which solves the problem that the location service of the local access network is unable to be used by the user and the user experience is influenced.

A method for locating a Secure User Plane Location (SUPL) Enabled Terminal (SET), comprising:

the SET obtaining location service information of a local access network when accessing the local access network, wherein, the location service information includes an address and/or identification of at least one location server in the local access network;

the SET transmitting the location service information of the local access network to a Home SUPL Location Platform (H-SLP) of the SET; and the SET receiving the location service information transmitted by the H-SLP, wherein, the location service information includes an address and/or identification of a location server providing location service for the SET in the local access network.

Wherein, the location service information of the local access network further comprises authorization information required for the SET to access a location service of the local access network.

Wherein, the step of the SET obtaining location service information of a local access network when accessing the local access network comprises:

the SET, after adhering to the local access network, receiving a network parameter of the local access network sent by the local access network, extracting the location service information of the local access network from the network parameter; or the SET, after adhering to the local access network, requesting the location service information of the local access network of the local access network from a Dynamic Host Configuration Protocol (DHCP) server of the local access network; or the SET constructing a domain name of the location server of the local access network, and regarding the domain name of the location server as the location service information of the local access network.

Before the step of the SET transmitting the location service information of the local access network to the H-SLP of the SET, further comprises:

the SET screening at least one obtained location service of the local access network according to a preset screening rule; and the SET obtaining an address and/or identification of the screened at least one location server, and generating the location service information of the local access network required to be sent to the H-SLP.

The method further comprises:

before the SET accesses a local network, setting the screening rule, and instructing the SET to screen the obtained at least one location server.

Wherein, the step of the SET transmitting the location service information of the local access network to the H-SLP of the SET comprises:

the SET transmitting the location service information of the local access network to the H-SLP through an SUPL system, wherein, the location service information of the local access network comprises one of or a combination of more of the following parameters:

the address of the location server, the identification of the location server, and an identification of the local access network.

After the step of the SET receiving the location service information transmitted by the H-SLP, further comprises:

the SET requesting the location service from a corresponding location server according to the location service information; and the SET obtaining location information of the SET, wherein, the location information is a location value or a reference value of the location value.

After the step of the SET obtaining location information of the SET, further comprises:

the SET transmitting the location information to the H-SLP.

The present invention also provides a method for locating a Secure User Plane Location (SUPL) Enabled Terminal (SET), a current access network of the SET being a local access network, and the method comprises:

a Home SUPL Location platform (H-SLP) receiving location service information of the local access network of the current access network of the SET transmitted by the SET, wherein, the location service information of the local access network comprises an address and/or identification of at least one location server in the local access network; and the H-SLP obtaining the location service information and transmitting the location service information to the SET according to the location service information of the local access network, wherein, the location service information comprises an address and/or identification of the location server providing location service for the SET.

Wherein, the location service information further comprises authorization information required for the SET to access the location server providing the location service for the SET.

Wherein, the step of the H-SLP obtaining the location service information and transmitting the location service information to the SET according to the location service information of the local access network comprises:

the H-SLP selecting the location server providing the location service for the SET according to a service signing relation of a service provider of at least one location server and/or a location server selection policy;

the H-SLP obtaining authorization information of the SET from the service provider of the location server providing the location service; and the H-SLP transmitting the location service information to the SET.

After the step of the H-SLP obtaining the location service information and transmitting the location service information to the SET according to the location service information of the local access network, further comprises:

the H-SLP receiving the location information transmitted by the SET, performing further location according to the location information, or providing the location information to a third party application.

The present invention also provides a Secure User Plane Location (SUPL) Enabled Terminal (SET), comprising:

an information obtaining module, configured to obtain location service information of a local access network when the SET accesses the local access network, wherein, the location service information of the local access network comprises an address and/or identification of at least one location server in the local access network;

an information transmitting module, configured to: transmit the location service information of the local access network to a Home SUPL Location Platform (H-SLP) of the SET; and an information receiving module, configured to: receive the location service information transmitted by the H-SLP, wherein, the location service information comprises an address and/or identification of the location server providing location service for the SET in the local access network.

Wherein, the location service information received by the information receiving module further comprises authorization information required for accessing the local location server.

The SET further comprises:

a screening module, configured to: screen at least one location server of the local access network obtained by the information obtaining module according to a preset screening rule; obtain an address and/or identification of the screened at least one location server, and generate the location service information of the local access network required to be sent to the H-SLP.

The SET further comprises:

a location performing module, configured to: request the location service from a corresponding location server according to the location service information, and obtain location information of the SET.

Wherein:

the information transmitting module is further configured to: transmit the location information of the SET obtained by the location performing module to the H-SLP.

The present invention also provides a Home Secure User Plane Location (SUPL) Location platform (H-SLP), comprising:

an information receiving module, configured to: receive location service information of a local access network of a current access network of a SUPL Enabled Terminal (SET) transmitted by the SET, wherein, the location service information of the local access network comprises an address and/or identification of at least one location server in the local access network; and a location instruction module, configured to: obtain the location service information and transmit the location service information to the SET according to the location service information of the local access network, wherein, the location service information comprises an address and/or identification of a location server providing location service for the SET.

Wherein, the location service information transmitted by the location instruction module further comprises authorization information required for the SET to access the location server providing the location service for the SET.

Wherein, the information receiving module is further configured to: receive the location information transmitted by the SET; and the location instruction module is further configured to: perform further location according to the location information received by the information receiving module, or provide the location information to a third party application.

The present invention also provides a system for locating a Secure User Plane Location (SUPL) Enabled Terminal (SET), comprising: a SET, a Home SUPL Location platform (H-SLP) of the SET and a location server in a local access network;

the SET is configured to obtain location service information of the local access network when accessing the local access network, wherein, the location service information of the local access network comprises an address and/or identification of at least one location server in the local access network, transmit the location service information of the local access network to the H-SLP, and receive the location service information transmitted by the H-SLP, wherein, the location service information comprises an address and/or identification of the location server providing the location service for the SET in the local access network; and the H-SLP is configured to receive the location service information of the local access network transmitted by the SET, wherein, the location service information of the local access network comprises an address and/or identification of at least one location server in the local access network, and obtain the location service information and transmit the location service information to the SET according to the location service information of the local access network, wherein, the location service information comprises an address and/or identification of a location server providing location service for the SET.

Wherein, the location service information further comprises authorization information required for the SET to access the location server providing the location service for the SET.

The embodiment of the present invention provides a method, apparatus and system for locating a SET. When the SET accesses other local access networks except for the home network, it obtains the location service information of the local access network, and sends the location service information of the local access network to the H-SLP of the SET. The H-SLP selects the location server providing the location service for the SET according to the location service information of the local access network, and sends the location service information to the SET, wherein, the location service information includes the address or identification of the location server in the local access network selected for the SET by the H-SLP and the authorization information, which solves the problem that the location service of the local access network is unable to be used and the user experience is influenced and implements the location service of the SET which accesses the visited local access network.

PREFERRED EMBODIMENTS OF THE PRESENT INVENTION

At present, the OMA LOC group already finishes the establishment work of the secure user plane location (SUPL1.0) standard, which already got extensive arrangement and application on the market. The work of the SUPL2.0 has already drawn to an end at present. The SUPL2.0 realizes the enhancement of the SUPL1.0 location function; for example, it increases the location of the trigger type, supports realizing the location function in different access networks etc., and also can support different Global Navigation Satellite System (GNSS) at the same time. At present, the OMA LOC group is establishing the technical specification of the SUPL3.0, which is at the first stage at present, that is, the requirement collecting stage.

Seen from the location technology, different location technologies will produce different location accuracies. For example, the accuracy provided by the location based on the cell identification (CELL ID) way is usually lower, but usually the realization is comparatively simple, and there is no requirement on the SET, that is, the location based on the CELL ID way can be suitable for any SET, and the requirement on the network is also generally lower at the same time, so, it becomes one of the most general location technologies at present. As to other location ways, such as, the location technology, like the Observed Time Difference of Arrival (OTDOA), the Enhanced Forward Link Trilateration (EFLT), etc., they can usually obtain higher accuracy but have a relatively high requirement on the network, thereby causing the increase of the cost of developing the location service by the operator.

Seen from the development of the location service in current industry, different services have different requirements on the location accuracy. For example, as to the weather forecast, or the social network based on location, usually the requirement on the accuracy are very low, varying from several hundred meters to several kilometers. And for some services, such as urgent request for help, or the location of street retail shops, it usually needs higher location accuracy. So, the location with a low accuracy generally cannot meet the development of the service very well.

Seen from the network operator, different network operators also can provide different location accuracies and location cost. For example, for the mobile operator, it can provide various base station locations based on their existing networks, and also can provide the Assisted Global Positioning System (AGPS) locating service at the same time. But for the fixed network operator, or the WLAN operator, or seen from the self-built communication network of the subway company, they generally cannot provide the location technology of the mobile operator, such as, the base station location and the AGPS location, etc., but they have their own location systems, or the location database in other words. The provided location result also possesses its own characteristic compared with the mobile operator. For example, for the WLAN operators, they can provide the readable address which is easy to understand according to the location of the AP; for the network operators of the subway communication, they have their own location data too, such as the location information, like the location of the subway, etc., while these location information is unavailable to the mobile operator.

Seen from the user, with the fast development of the electronic SET, more and more users might have a plurality of SETs at the same time, and some SETs, such as the mobile phone, the mobile Personal Digital Assistant (PDA), etc., have certain mobility, and the location thereof may change at any time, thus different communication operators might be selected to serve them at any time. For example, the user enters the subway from the street ground while carrying the mobile phone SET. So, the access network selected by the mobile phone may switch from the mobile cellular network to the WLAN network, etc. provided by the subway company. At this moment, even if the mobile network can cover the subway, but the WLAN generally has the low expenses and higher bandwidth and can provide the particular location information at the same time, thus it can attract the user to switch to the WLAN network and to use the location service provided by the WLAN network.

Seen from the secure user plane location technology specification established by the OMA LOC, which defines that, for the location service of the SET, the general realization way is that the SET connects to the global Home SLP (H-SLP) when the SET requests the location service, and the mobile network operator continues providing location service. But for the above-mentioned scenario, the user may not always hope to use the home location server to perform the location. At the same time, in above-mentioned scenario, the accuracy or readability of the location information obtained by using the home location server may be not as good as the location service provided by the WLAN operator. So, the SET of the user may select to access the local location server through the current local access network to obtain the location service.

Seen from the current technology realization, the OMA LOC group defines that the location service is obtained from H-SLP all the time.

For the operator of the PLMN, they hope that no matter the user of the Home Network accesses the PLMN or accesses other local access networks, the user can access the location service conveniently. When the user accesses the local access network, since the location service provided by the local access network may meet the user requirement even more, at this moment the operator hopes the user can also use the location service of the local access network in a situation that the user does not sign the service with the local access network.

In order to achieve the above-mentioned object, the embodiment of the present invention provides a method for locating the SET. By using the method, the SET is still managed uniformly by the SUPL location system provided by the PLMN when selecting the location service of the local access network.

The embodiments of the present invention will be described with reference to the accompanying drawings hereinafter. It should be illustrated that, in the case of no conflict, the embodiments in the present application and features in these embodiments can be combined at will with each other.

The embodiment one of the present invention is described firstly.

Figure 3:
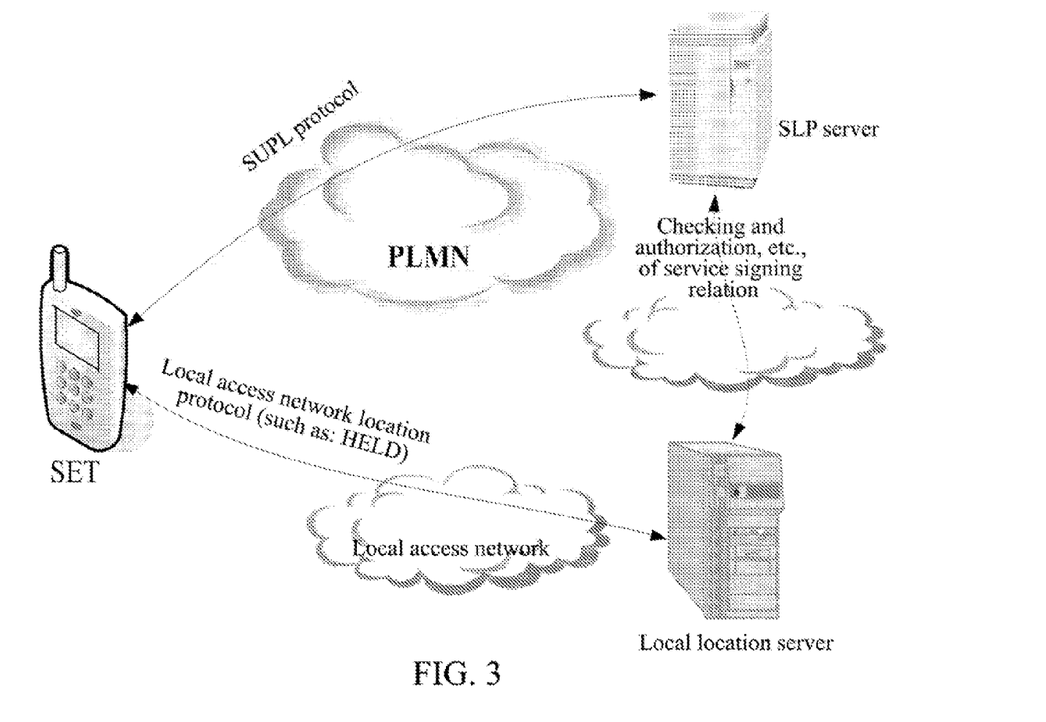
FIG. 3 is a schematic diagram of implementation of locating SET by the method of locating SET provided by an embodiment of the present invention.

The embodiment one of the present invention provides a method for locating the SET, which realizes the SET locating by way of accessing the local access network, as shown in FIG. 3. Compared with the FIG. 2, in the method for locating the SET provided by the present invention, there is a mutual service interaction relation between the H-SLP and the location server of the local access network.

In the traditional location system, the location service of the local access network is totally independent with the location service provided by the PLMN operator. Through the way illustrated in FIG. 3, service relation is established between the location service in the PLMN with the location service provided by the local network operator, that is, the location service provider of the PLMN takes the place of the SET and performs signing the service contract and service access request authorization, etc., directly with the location service provider of the local access network which is accessed currently. In this way, the service experience of the user can be improved effectively. So long as the user signs the service relation with one operator, he/she can continue using the same service even roaming to other networks, and does not need to sign the service contract once again.

Further, in order to realize the above-mentioned function, the SET needs to find the corresponding location servers in the local access network at first, and then sends the information, such as the identification or address information of these servers, etc., to the H-SLP through the SUPL channel to perform the selection.

Further, after the H-SLP determines to select which location server of the local access network specifically, the H-SLP sends the selection information to the SET, and at the same time needs to send the information, such as the corresponding key for accessing the local location service.

Figure 4:
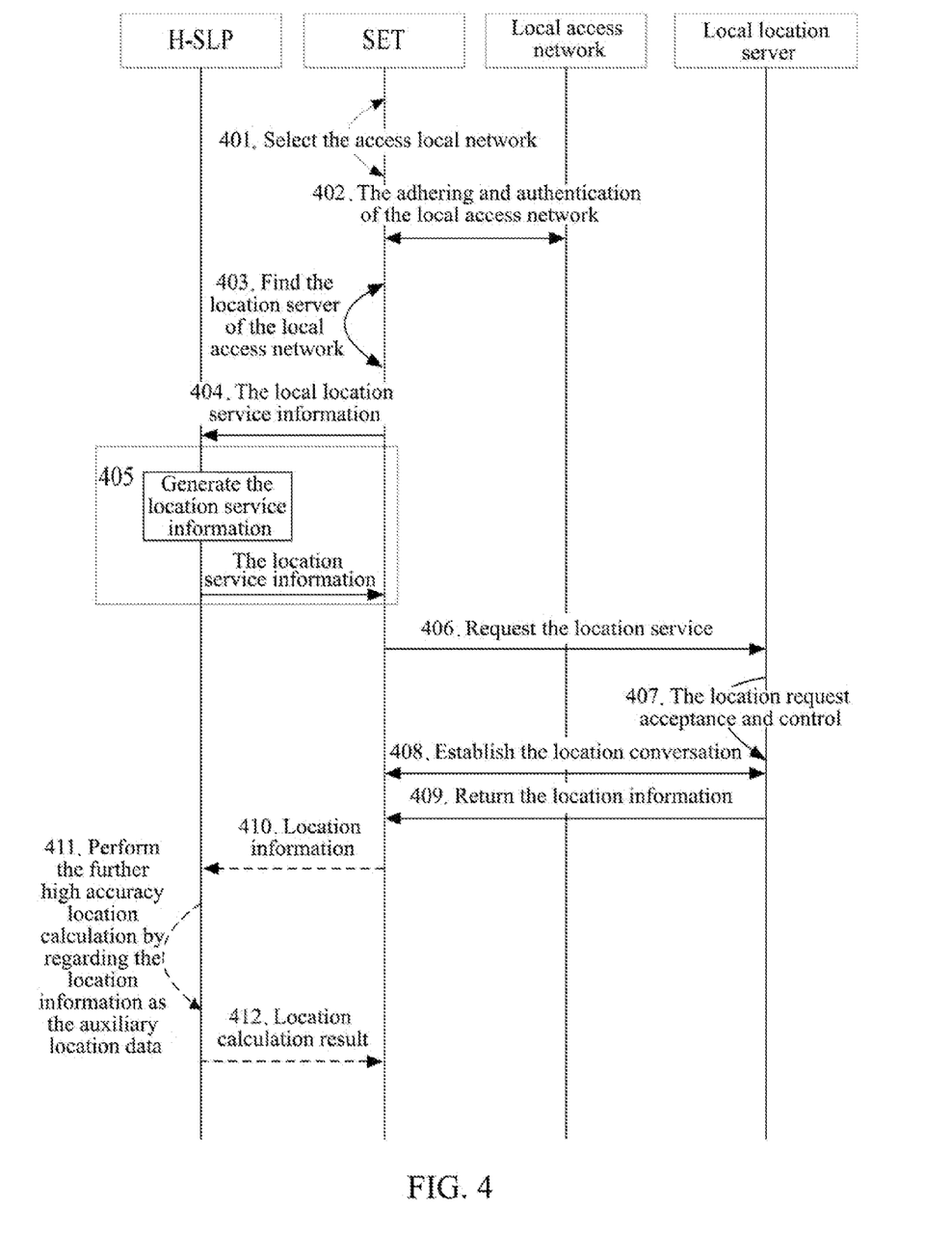
FIG. 4 is a flow chart of a method for locating SET provided by an embodiment of the present invention.

The flow of the SET finishes obtaining the location service from the local access network by using the SET location method provided by the embodiment of the present invention is as shown in FIG. 4. It should be understood that the preferred embodiments described here are only used to illustrate and explain the present invention, and is not used to limit the present invention. It includes the following steps specifically:

in step 401, the SET selects to access the local network;

in this step, the SET selects to access one local access network according to the current location; in the embodiment of the present invention, the local access network refers to other network except for the SET home network (such as the PLMN).

In step 402, the SET performs the accessing and adhering process to the local access network, and the local access network performs the service logic processing, such as, authenticating the adhering of the SET;

in step 403, the SET obtains the location service information of the local access network;

in this step, the SET needs to find the location service information of the local access network at first before requesting the location service, and the location service information of the local access network may be an address and/or identification (the identification is unique for identify one location server) of at least one local location server of the local access network (abbreviated as the local location server hereinafter).

Figure 5:
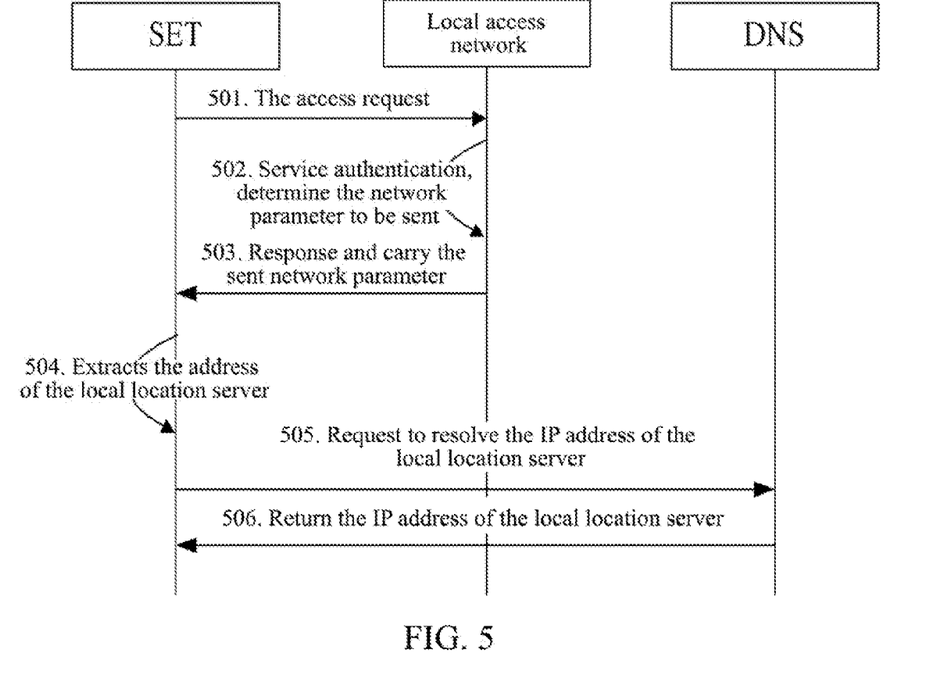
FIG. 5 is a flow chart of a specific implementation of step 403 in FIG. 4.

The specific realization method of the present step is shown in FIG. 5, including:

in step 501, the SET selects to access the local network, and sends the access request to the local access network;

in step 502, the local access network performs the service authentication to the SET, and determines the network parameter of the local access network to be sent;

in step 503, the local access network returns the response of the access request to the SET and sends the network parameter of the local access network;

in step 504, the SET extracts the address of the location server of the local access network from the sent network parameter;

in step 505, the SET sends the obtained address of the local location server to the Domain Name Server (DNS) to perform the domain name resolution;

in step 506, the DNS returns the IP address information of the location server of the local access network back to the SET.

Figure 6:
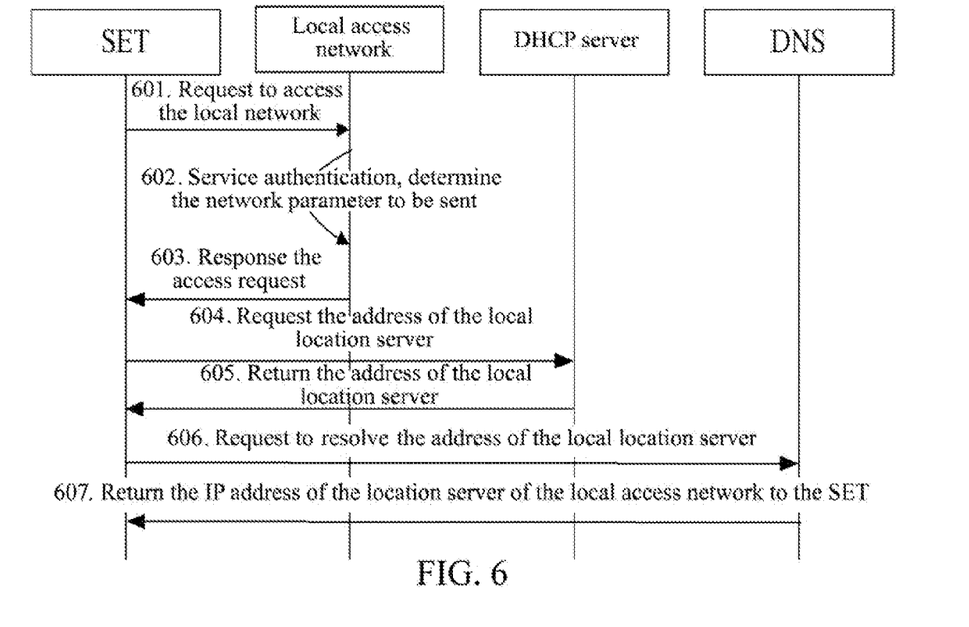
FIG. 6 is a flow chart of another specific implementation of step 403 in FIG. 4.

The present step has another realization method, as shown in FIG. 6 specifically, including:

in step 601, the SET selects the current local access network, and sends the access request to the local access network;

in step 602, the local access network performs the service authentication to the SET, and determines the network parameter of the local access network to be sent;

in step 603, the local access network returns the response of the access request to the SET and sends the network parameter of the local access network;

in step 604, the SET requests the address of the location server of the local access network from the Dynamic Host Configuration Protocol (DHCP) server;

in step 605, the DHCP server returns the address of the local location server;

in step 606, the SET sends the obtained address of the local location server to the DNS to perform the domain name resolution;

in step 607, the DNS returns the resolved IP address of the location server of the local access network back to the SET.

Figure 7:
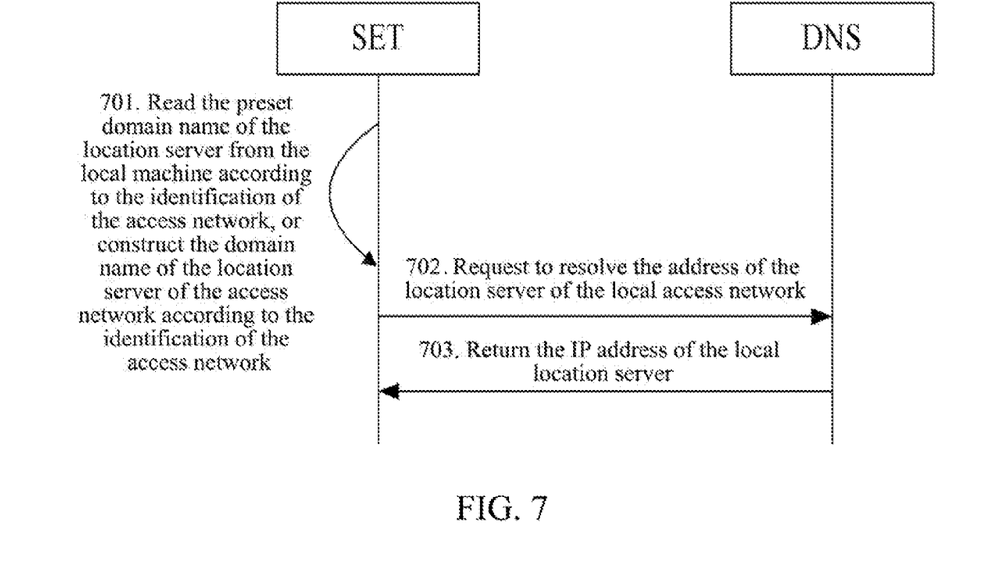
FIG. 7 is a flow chart of yet another specific implementation of step 403 in FIG. 4.

Another implementation method of the present step is as shown in FIG. 7, including:

in step 701, the SET selects the current local access network, and reads the preset domain name of the location server of the local access network from the local machine according to the identification of the local access network;

or, construct the domain name of the location server of the local access network according to the identification of the local access network, such as LS.NETWORKTYPE.OPERATORNAME.COM M;

in step 702, the SET request the DNS to resolve the address information of the location server of the local access network;

in step 703, the DNS returns the IP address of the local location server to the SET.

Alternatively, before the SET accesses the local access network, the screening rule is set to indicate the SET to screen at least one obtained location server. In the present step, the SET can also screen at least one obtained location server of the local access network according to the preset screening rule, and the SET produces new location service information of the local access network according to the screening result. Specifically, the screening rule can be screening according to the factors, such as the accuracy, cost of the location, and the location information expression way, etc.

Besides above-mentioned method, the address and/or identification of each local location server in the local access network also can be obtained through the LETF LIS finding mechanism.

In addition, the SET can also obtain the identification of the location server in the local access network, and the principle of the obtaining method is the same as the above-mentioned method for obtaining the address, which will no longer be described in detail.

The identification of the location server can be configured when the network is initialized or determined by the service provider itself, and is stored in its home local access network.

In step 404, the SET sends the location service information of the local access network to the H-SLP, to request the H-SLP to perform the judgment and selection of the local location server and obtain the authorization of the H-SLP for performing the location service as well;

in the present step, the SET sends the location service information of the local access network to the H-SLP of the SET through the SUPL conversation; alternatively, the SUPL conversation can also carry the address information of the SET, and the ability of the SET, etc. The ability information of the SET is mainly used subsequently when the H-SLP determines to use which location server of the local access network.

In step 405, the H-SLP selects the local location server providing the location service for the SET according to the location service information of the local access network, generates the location service information and sends the location service information to the SET;

in the present step, the H-SLP selects, after receiving the location service information of the local access network, the local location server providing the location service for the SET, which may be one location server, or two or more location servers, according to the address and/or identification of the location server included in the location service information of the local access network, the identification information of the network at which these location servers locate, and the service signing relations with the service providers of different location servers and its own policy.

The H-SLP sends the location service information to the SET, where the location service information includes at least one of the address and identification of the selected local location server and the authorization information, to instruct the SET to implement the location through the local location server selected by the SLP.

Figure 8:
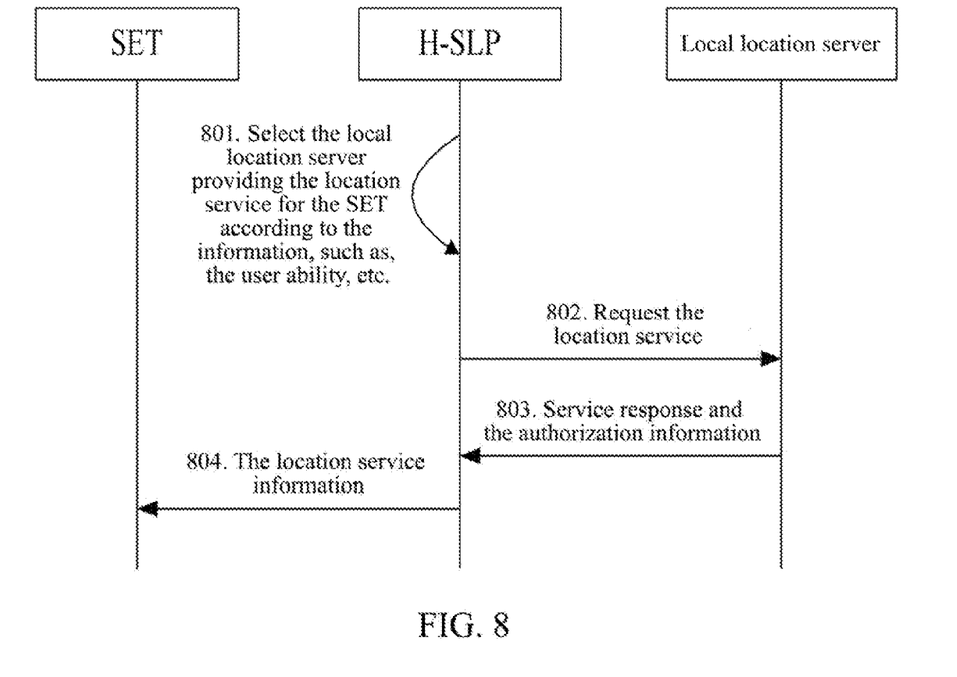
FIG. 8 is a flow chart of a specific implementation of step 405 in FIG. 4.

The present step is as shown in FIG. 8 specifically, including:

in step 801, determine the local location server that the SET will access according to the location service information and the ability information of the SET, etc. If there is only one local location server according to the location service information reported by the SET, then the H-SLP does not need to make the determination.

in step 802, the H-SLP request the location service from the determined local location server, where the request information includes the information, such as, the SET identification;

in step 803, the local location server performs the service response, and returns the authorization information to the home location server.

In step 804, the H-SLP returns the identification of the determined local location server and the authorization information to the SET through the location service information (such as the SUPL conversation).

in step 406, the SET requests the location service from the corresponding location server according to the location service information;

in the present step, the SET sends the location request message to the location server of the local access network determined by the H-SLP by using the $4^{th}$ service authorization information, where the location request message includes the authorization information.

In step 407, the location server in the local access network performs the acceptance control process, such as, authentication, etc., to the SET;

in step 408, the SET performs the location service interaction with the local location server of the local access network;

in the present step, the SET establishes the location conversation with the local access network.

In step 409, the local location server returns the location information of the SET to the SET;

in the present step, the location information may be in a value format specifically, that is, what the local location server returns is the location value of the SET; and may also be a format of the reference value, that is, the SET may obtain the actual value of the location at any time through the reference value subsequently.

in step 410, according to the situation of the SET, the SET can regard the obtained location information as the location result, and send the location information to the H-SLP to perform further high accuracy location. At this moment, the SET establishes the SUPL location conversation with the H-SLP at first, and after the conversation is established completely, the SET sends the previous location result to the H-SLP through the SUPL;

in step 411, the H-SLP regards the location result reported by the SET as the auxiliary location data, to perform the further high accuracy location calculation;

in step 412, the H-SLP sends the location calculation result to the SET through the SUPL conversation. The procedure ends.

It needs to be illustrated that steps 410, 411 and 412 are optional steps. When step 409 is performed, if the SET determines that the location information obtained from the local location server meets the requirement, then the location procedure ends after step 409. When the SET determines that the location information obtained from the location server of the local access network cannot meet its requirement, then step 410 to step 412 are performed to obtain the location information with more higher accuracy.

Figure 9:
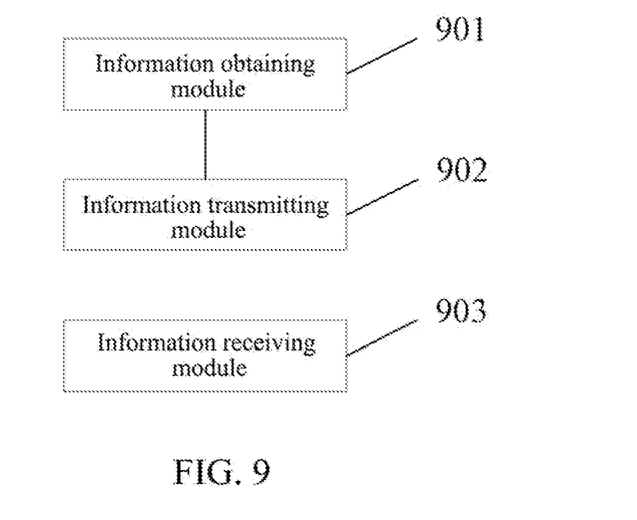
FIG. 9 is a schematic diagram of the structure of an apparatus for locating SET provided by an embodiment of the present invention.

The embodiment of the present invention further provides a SET, of which the structure is as shown in FIG. 9, including:

an information obtaining module 901, configured to obtain location service information of a local access network when the SET accesses the local access network, wherein, the location service information of the local access network includes an address and/or identification of at least one location server in the local access network;

an information transmitting module 902, configured to: transmit the location service information of the local access network to a Home SUPL Location Platform (H-SLP) of the SET; and an information receiving module 903, configured to: receive the location service information transmitted by the H-SLP, wherein, the location service information includes an address and/or identification of a location server in the local access network selected for the SET by the H-SLP.

Wherein, the location service information of the local access network received by the information receiving module 903 may further include authorization information required for accessing the local location server.

Figure 10:
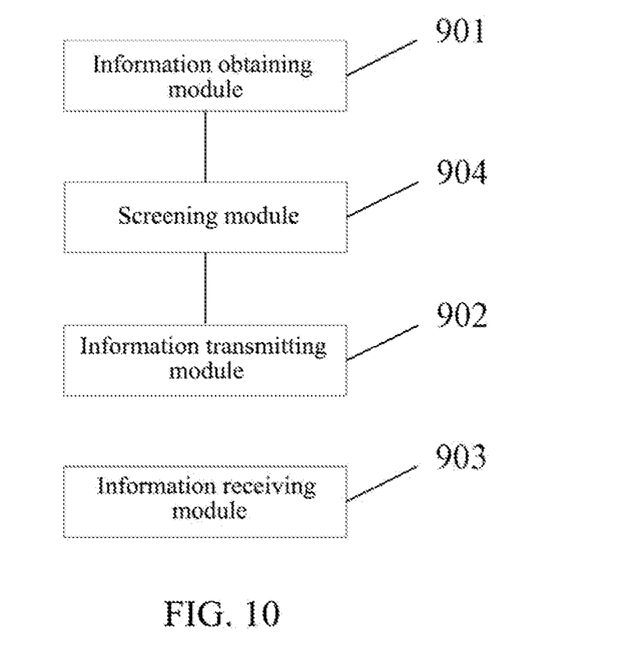
FIG. 10 is a schematic diagram of the structure of another apparatus for locating SET provided by an embodiment of the present invention.

Further, the above-mentioned SET as shown in FIG. 10 further includes:

a screening module 904, configured to: screen at least one location server of the local access network obtained by the information obtaining module according to a preset screening rule; obtain an address and/or identification of the screened at least one location server.

Figure 11:
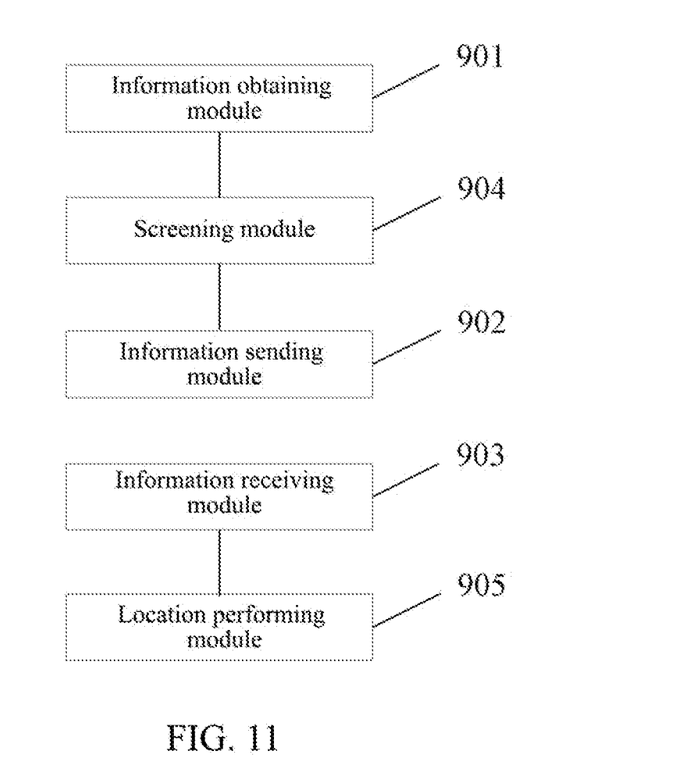
FIG. 11 is a schematic diagram of the structure of yet another apparatus for locating SET provided by an embodiment of the present invention.

Further, the above-mentioned SET as shown in FIG. 11 further includes:

a location performing module 905, configured to: request the location service from a corresponding location server according to the location service information, and obtain location information of the SET.

The information transmitting module 902 is further configured to: transmit the location information of the SET obtained by the location performing module 905 to the H-SLP.

Figure 12:
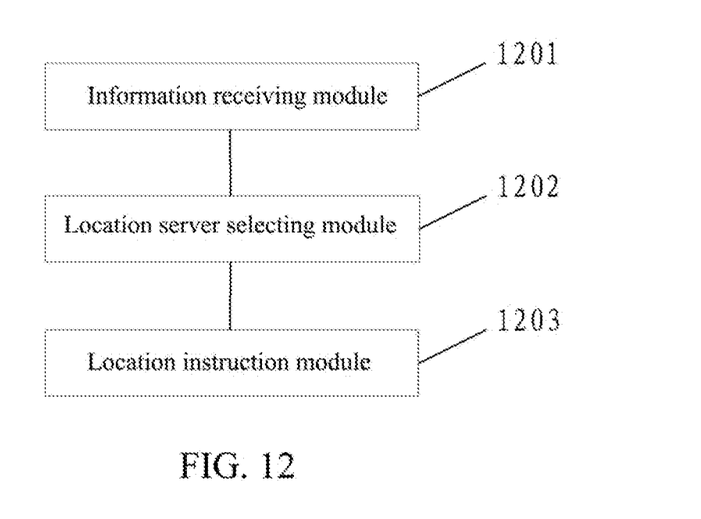
FIG. 12 is a schematic diagram of the structure of yet another apparatus for locating SET provided by an embodiment of the present invention.

The embodiment of the present invention further provides a Home Secure User Plane Location (SUPL) Location platform (H-SLP), of which the structure is as shown in FIG. 12, including:

an information receiving module 1201, configured to: receive location service information of a local access network of a current access network of a SUPL Enabled Terminal (SET) transmitted by the SET which belongs to the local access network, wherein, the location service information of the local access network comprises an address and/or identification of at least one location server in the local access network;

a location service selecting module 1202, configured to: select the location server providing location service for the SET according to the location service information of the local access network; and a location instruction module 1203, configured to: generate the location service information and send the location service information to the SET, to instruct SET to implement the location through the location server providing the location service, wherein, the location service information includes the address and/or identification of a location server providing location service for the SET.

Wherein, the location service information transmitted by the location instruction module 1203 further comprises authorization information required for the SET to access the location server providing the location service for the SET.

The information receiving module 1201 is further configured to: receive the location information sent by the SET; and the location instruction module 1203 is further configured to: perform further location according to the location information received by the information receiving module, or provide the location information to a third party application.

A system for locating the SET includes: a SET, an H-SLP of the SET and a location server in a local access network;

the SET is configured to obtain location service information of the local access network when accessing the local access network, wherein, the location service information of the local access network comprises an address and/or identification of at least one location server in the local access network, transmit the location service information of the local access network to the H-SLP, and receive the location service information transmitted by the H-SLP, wherein, the location service information includes an address and/or identification of the location server of the local access network selected for the SET by the H-SLP; and the H-SLP is configured to receive the location service information of the local access network transmitted by the SET, wherein, the location service information of the local access network comprises an address and/or identification of at least one location server in the local access network, and select the location server providing the location service to the SET according to the location service information of the local access network, and sends the location service information to the SET, wherein, the location service information includes the address and/or identification of the location server providing location service for the SET.

Wherein, the location service information may further include authorization information required for the SET to access the location server providing the location service for the SET.

The above-mentioned SET, H-SLP and SET location system can be combined with one SET location method provided by the embodiment of the present invention. When the SET accesses other local access networks except for the home network, it obtains the location service information of the local access network, and sends the location service information of the local access network to the H-SLP of the SET. The H-SLP selects the location server providing the location service for the SET according to the location service information of the local access network, and sends the location service information to the SET to instruct the SET to implement the location through the location server selected by the SLP, which realizes the management of the location service of the SET which accesses the visited local access network and solves the problem that the location service of the local access network is unable to be used and the user experience is influenced.

It can be understood by those skilled in the art that all or part of the steps in the above-mentioned method of the embodiments can be fulfilled by programs instructing the relevant hardware, and the programs can be stored in a computer readable storage medium. When the programs are performed, one of the steps or their combination of the method embodiments is included.

In addition, each function unit in each embodiment of the present invention can be implemented in the form of hardware, or implemented in the form of software function module. When the integrated module is implemented in the form of software function module and sold or used as an individual product, it also can be stored in a computer readable storage medium.

The above-mentioned storage medium can be a read only memory (ROM), a magnetic disk or an optical disk, etc.

The above description is only embodiments of the present invention, and it is not intended to limit the protective scope of the present invention. Variations or alternatives easily thought out by those skilled in the art within the technical scope disclosed by the present invention should be covered by the protective scope of the present invention. Therefore, the protective scope of the present invention should be based on the protective scope of the claims.

INDUSTRIAL APPLICABILITY

The embodiment of the present invention provides a method, apparatus and system for locating SET. When the SET accesses other local access networks except for the home network, it obtains the location service information of the local access network, and sends the location service information to the H-SLP of the SET. The H-SLP selects the location server providing the location service for the SET according to the location service information, and sends the location service information to the SET, wherein, the location service information includes the address or identification of the location server in the local access network selected for the SET by the H-SLP and the authorization information, which solves the problem that the location service of the local access network impacts the user experience and implements the location service of the SET which accesses the visited local access network.

What is claimed is:

1. A method for locating a Secure User Plane Location (SUPL) Enabled Terminal (SET), comprising:
the SET obtaining location service information of a local access network when accessing the local access network, wherein, the location service information includes an address and/or identification of at least one location server in the local access network;
the SET transmitting the location service information of the local access network to a Home SUPL Location Platform (H-SLP) of the SET; and
the SET receiving the location service information transmitted by the H-SLP, wherein, the location service information includes an address and/or identification of a location server providing location service for the SET in the local access network;
wherein, before the step of the SET transmitting the location service information of the local access network to the H-SLP of the SET, further comprising:
the SET screening at least one obtained location service of the local access network according to a preset screening rule; and the SET obtaining an address and/or identification of the screened at least one location server, and generating the location service information of the local access network required to be sent to the H-SLP.

2. The method according to claim 1, wherein, the location service information of the local access network further comprises authorization information required for the SET to access a location service of the local access network.

3. The method according to claim 1, wherein, the step of the SET obtaining location service information of a local access network when accessing the local access network comprises:
the SET, after adhering to the local access network, receiving a network parameter of the local access network sent by the local access network, extracting the location service information of the local access network from the network parameter; or
the SET, after adhering to the local access network, requesting the location service information of the local access network of the local access network from a Dynamic Host Configuration Protocol (DHCP) server of the local access network; or
the SET constructing a domain name of the location server of the local access network, and regarding the domain name of the location server as the location service information of the local access network.

4. The method according to claim 1, further comprising:
before the SET accesses a local network, setting the screening rule, and instructing the SET to screen the obtained at least one location server.

5. The method according to claim 1, wherein, the step of the SET transmitting the location service information of the local access network to the H-SLP of the SET comprises:
the SET transmitting the location service information of the local access network to the H-SLP through an SUPL system, wherein, the location service information of the local access network comprises one of or a combination of more of the following parameters:
the address of the location server, the identification of the location server, and an identification of the local access network.

6. The method according to claim 1, after the step of the SET receiving the location service information transmitted by the H-SLP, further comprising:
the SET requesting the location service from a corresponding location server according to the location service information; and
the SET obtaining location information of the SET, wherein, the location information is a location value or a reference value of the location value.

7. The method according to claim 6, after the step of the SET obtaining location information of the SET, further comprising:
the SET transmitting the location information to the H-SLP.

8. A method for locating a Secure User Plane Location (SUPL) Enabled Terminal (SET), a current access network of the SET being a local access network, and the method comprising:
a Home SUPL Location platform (H-SLP) receiving location service information of the local access network of the current access network of the SET transmitted by the SET, wherein, the location service information of the local access network comprises an address and/or identification of at least one location server in the local access network; and
the H-SLP obtaining the location service information and transmitting the location service information to the SET according to the location service information of the local access network, wherein, the location service information comprises an address and/or identification of the location server providing location service for the SET;
wherein, the step of the H-SLP obtaining the location service information and transmitting the location service information to the SET according to the location service information of the local access network comprises:
the H-SLP selecting the location server providing the location service for the SET according to a service signing relation of a service provider of at least one location server and/or a location server selection policy;
the H-SLP obtaining authorization information of the SET from the service provider of the location server providing the location service; and
the H-SLP transmitting the location service information to the SET.

9. The method according to claim 8, wherein, the location service information further comprises authorization information required for the SET to access the location server providing the location service for the SET.

10. The method according to claim 8, after the step of the H-SLP obtaining the location service information and transmitting the location service information to the SET according to the location service information of the local access network, further comprising:
the H-SLP receiving the location information transmitted by the SET, performing further location according to the location information, or providing the location information to a third party application.

11. A Home Secure User Plane Location (SUPL) Location platform (H-SLP), comprising:
an information receiving module, configured to: receive location service information of a local access network of a current access network of a SUPL Enabled Terminal (SET) transmitted by the SET, wherein, the location service information of the local access network comprises an address and/or identification of at least one location server in the local access network; and a location instruction module, configured to: obtain the location service information and transmit the location service information to the SET according to the location service information of the local access network, wherein, the location service information comprises an address and/or identification of a location server providing location service for the SET;

wherein, the location instruction module is further configured to: obtain the location service information and transmit the location service information to the SET according to the location service information of the local access network by the following way:

selecting the location server providing the location service for the SET according to a service signing relation of a service provider of at least one location server and/or a location server selection policy;

obtaining authorization information of the SET from the service provider of the location server providing the location service; and transmitting the location service information to the SET.

12. The H-SLP according to claim 11, wherein, the location service information transmitted by the location instruction module further comprises authorization information required for the SET to access the location server providing the location service for the SET.

13. The H-SLP according to claim 11, wherein, the information receiving module is further configured to: receive the location information transmitted by the SET; and the location instruction module is further configured to: perform further location according to the location information received by the information receiving module, or provide the location information to a third party application.

* * * * *